US012253233B2

(12) United States Patent
Mori et al.

(10) Patent No.: US 12,253,233 B2
(45) Date of Patent: Mar. 18, 2025

(54) VEHICLE LIGHTING DEVICE AND VEHICLE LAMP

(71) Applicant: Toshiba Lighting & Technology Corporation, Kanagawa (JP)

(72) Inventors: Hiraku Mori, Ehime (JP); Daisuke Kosugi, Ehime (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 135 days.

(21) Appl. No.: 18/180,148

(22) Filed: Mar. 8, 2023

(65) Prior Publication Data

US 2023/0349531 A1 Nov. 2, 2023

(30) Foreign Application Priority Data

May 2, 2022 (JP) ................................ 2022-075770

(51) Int. Cl.

*H05B 45/48* (2020.01)
*F21S 41/19* (2018.01)
*F21S 41/663* (2018.01)
*F21S 43/19* (2018.01)

(52) U.S. Cl.

CPC ........... *F21S 41/663* (2018.01); *F21S 41/192* (2018.01); *F21S 43/195* (2018.01)

(58) Field of Classification Search

CPC ........ H05B 45/48; H05B 45/52; H05B 45/54; H05B 45/345; H05B 47/14; H05B 47/105; H05B 47/155; B60Q 1/0088; B60Q 1/2607; F21S 41/192; F21S 41/663; F21S 43/195

See application file for complete search history.

(56) References Cited

U.S. PATENT DOCUMENTS

| | | | | |
|---|---|---|---|---|
| 7,468,723 | B1 * | 12/2008 | Collins | H05B 45/38 345/82 |
| 2013/0200812 | A1 * | 8/2013 | Radermacher | H05B 45/44 315/186 |
| 2016/0205742 | A1 * | 7/2016 | Seki | H05B 45/46 315/122 |
| 2017/0223805 | A1 * | 8/2017 | Kosugi | H05B 45/397 |

(Continued)

FOREIGN PATENT DOCUMENTS

| | | |
|---|---|---|
| EP | 3277056 | 1/2018 |
| JP | 2015063252 | 4/2015 |

(Continued)

*Primary Examiner* — Tung X Le
(74) *Attorney, Agent, or Firm* — JCIPRNET

(57) ABSTRACT

A vehicle lighting device and a vehicle lamp are provided. The vehicle lighting includes a socket; a substrate provided on one end portion side of the socket; light emitting elements provided on the substrate; and a control element provided on the substrate and electrically connected to the light emitting elements. The control element turns on some of the light emitting elements when the input voltage is lower than a first voltage; turns on all of the light emitting elements when the input voltage exceeds a second voltage higher than the first voltage; and turns on all of the light emitting elements and changes at least one of total luminous flux of the light emitting elements and current flowing through the light emitting elements according to the input voltage when the input voltage is equal to or higher than the first voltage and equal to or lower than the second voltage.

12 Claims, 6 Drawing Sheets

(56) References Cited

U.S. PATENT DOCUMENTS

| | | | | |
|---|---|---|---|---|
| 2018/0029527 | A1* | 2/2018 | Kosugi .................. | H05B 45/44 |
| 2018/0092167 | A1* | 3/2018 | Park ........................ | H05B 45/46 |
| 2018/0098393 | A1* | 4/2018 | Matsumoto .......... | B60Q 1/1415 |
| 2019/0239308 | A1* | 8/2019 | Lee ......................... | H05B 45/20 |
| 2020/0271308 | A1* | 8/2020 | Yasutake ............... | F21S 41/141 |

FOREIGN PATENT DOCUMENTS

| | | |
|---|---|---|
| JP | 2021079899 | 5/2021 |
| WO | 2021206145 | 10/2021 |

* cited by examiner

VEHICLE LIGHTING DEVICE AND VEHICLE LAMP

CROSS-REFERENCE TO RELATED APPLICATION

This application claims the priority benefits of Japanese application no. 2022-075770, filed on May 2, 2022. The entity of the above-mentioned patent application is hereby incorporated by reference herein and made a part of this specification.

BACKGROUND

Technical Field

Embodiments of the disclosure relate to a vehicle lighting device and a vehicle lamp.

Related Art

From the viewpoint of energy saving and long service life, vehicle lighting devices equipped with light emitting elements such as light emitting diodes are becoming more popular instead of vehicle lighting devices equipped with filaments.

Here, the voltage (input voltage) applied to the vehicle lighting device fluctuates. For example, in the case of a vehicle lighting device installed in an automobile, the input voltage fluctuates in the range of 9V to 16V. As the input voltage drops, the total luminous flux decreases according to the forward voltage drop of a plurality of light emitting elements connected in series. As a result, when the input voltage drops, the total luminous flux of the vehicle lighting device may become less than a specified value.

Thus, techniques have been proposed to reduce the number of light emitting elements to be turned on when the input voltage drops. When the number of light emitting elements to be turned on is reduced, the forward voltage drop is reduced, such that the required total luminous flux can be secured.

However, if only the number of light emitting elements to be turned on is changed, the rate of change in the total luminous flux increases when the number of light emitting elements to be turned on is changed.

Thus, it has been desired to develop a technique that can secure the required total luminous flux and suppress an increase in the rate of change of the total luminous flux even if the input voltage fluctuates.

CITATION LIST

Patent Literature

[Patent Literature 1] JP 2015-63252 A

The problem to be solved by the disclosure is to provide a vehicle lighting device and a vehicle lamp that can secure a required total luminous flux and suppress an increase in the rate of change of the total luminous flux even if the input voltage fluctuates.

Solution to Problem

SUMMARY

A vehicle lighting device according to an embodiment includes a socket; a substrate provided on one end portion side of the socket; a plurality of light emitting elements provided on the substrate; and a control element provided on the substrate and electrically connected to the plurality of light emitting elements. The control element turns on some of the plurality of light emitting elements when the input voltage is lower than a first voltage. The control element turns on all of the plurality of light emitting elements when the input voltage exceeds a second voltage higher than the first voltage. The control element turns on all of the plurality of light emitting elements, and changes at least one of a total luminous flux of the plurality of light emitting elements and a current flowing through the plurality of light emitting elements according to the input voltage when the input voltage is equal to or higher than the first voltage and equal to or lower than the second voltage.

A vehicle lamp according to an embodiment includes the vehicle lighting device, and a casing body to which the vehicle lighting device is installed.

Figure 6:
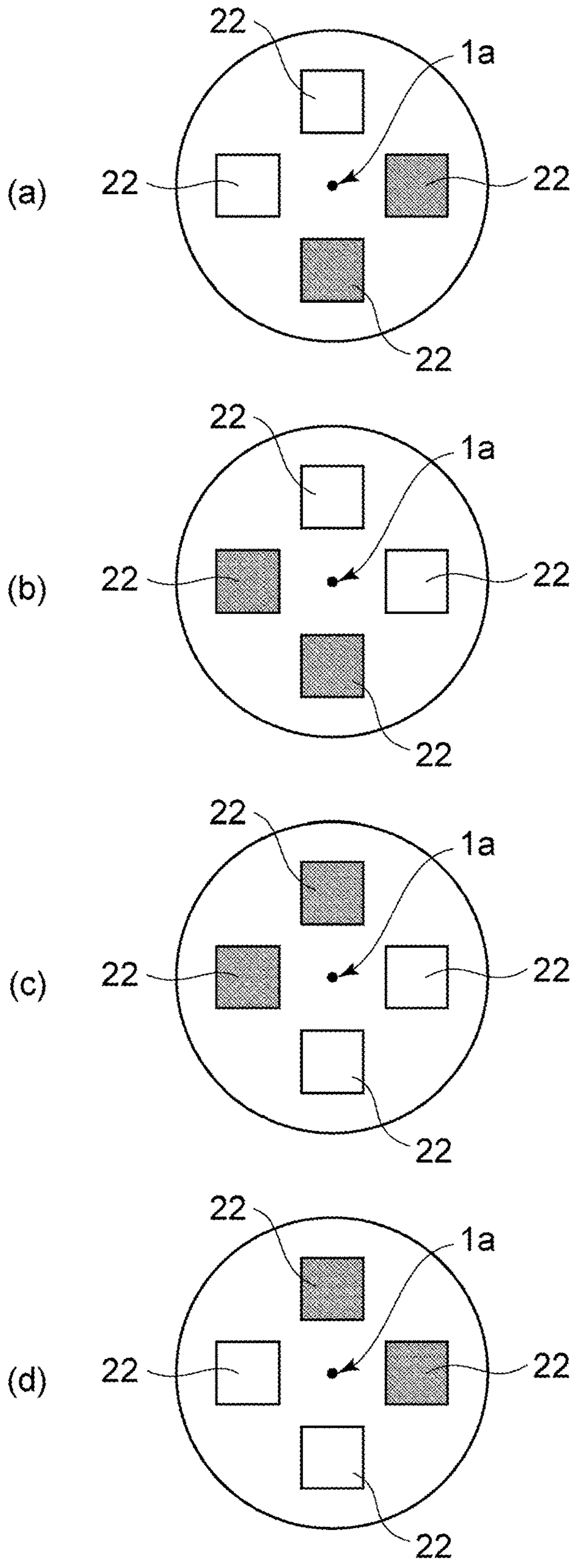

(a) to (d) of FIG. 6 are schematic diagrams for illustrating a case where two of four light emitting elements are turned on.

Figure 7:
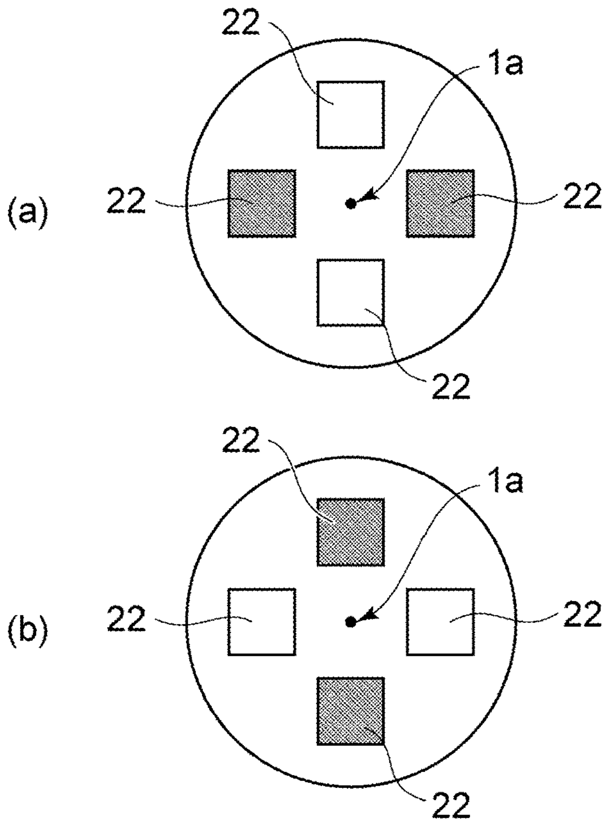

(a) and (b) of FIG. 7 are schematic diagrams for illustrating a case where two of four light emitting elements are turned on.

Figure 8:
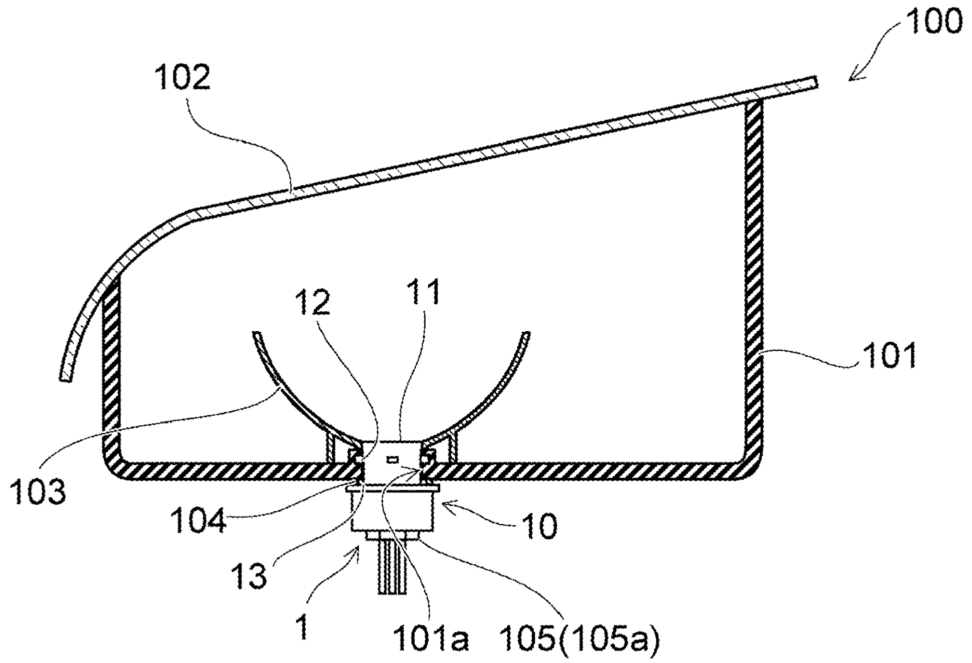

FIG. 8 is a schematic partial cross-sectional diagram for illustrating a vehicle lamp.

DESCRIPTION OF THE EMBODIMENTS

According to the embodiments of the disclosure, it is possible to provide a vehicle lighting device and a vehicle lamp that can ensure a required total luminous flux and suppress an increase in the rate of change of the total luminous flux even if the input voltage fluctuates.

Hereinafter, embodiments will be illustrated with reference to the drawings. Moreover, in each drawing, the same reference numerals are given to the same constituent components, and detailed description thereof will be omitted as appropriate.

(Vehicle Lighting Device)

A vehicle lighting device 1 according to this embodiment may be installed in, for example, an automobile or a railroad vehicle. Examples of the vehicle lighting device 1 provided in an automobile include those used for front combination lights (for example, appropriate combination of daytime running lamps (DRL), position lamps, turn signal lamps, etc.), rear combination lights (for example, appropriate combination of stop lamps, tail lamps, turn signal lamps, back lamps, fog lamps, etc.) and the like. However, the applications of the vehicle lighting device 1 are not limited thereto.

Figure 1:
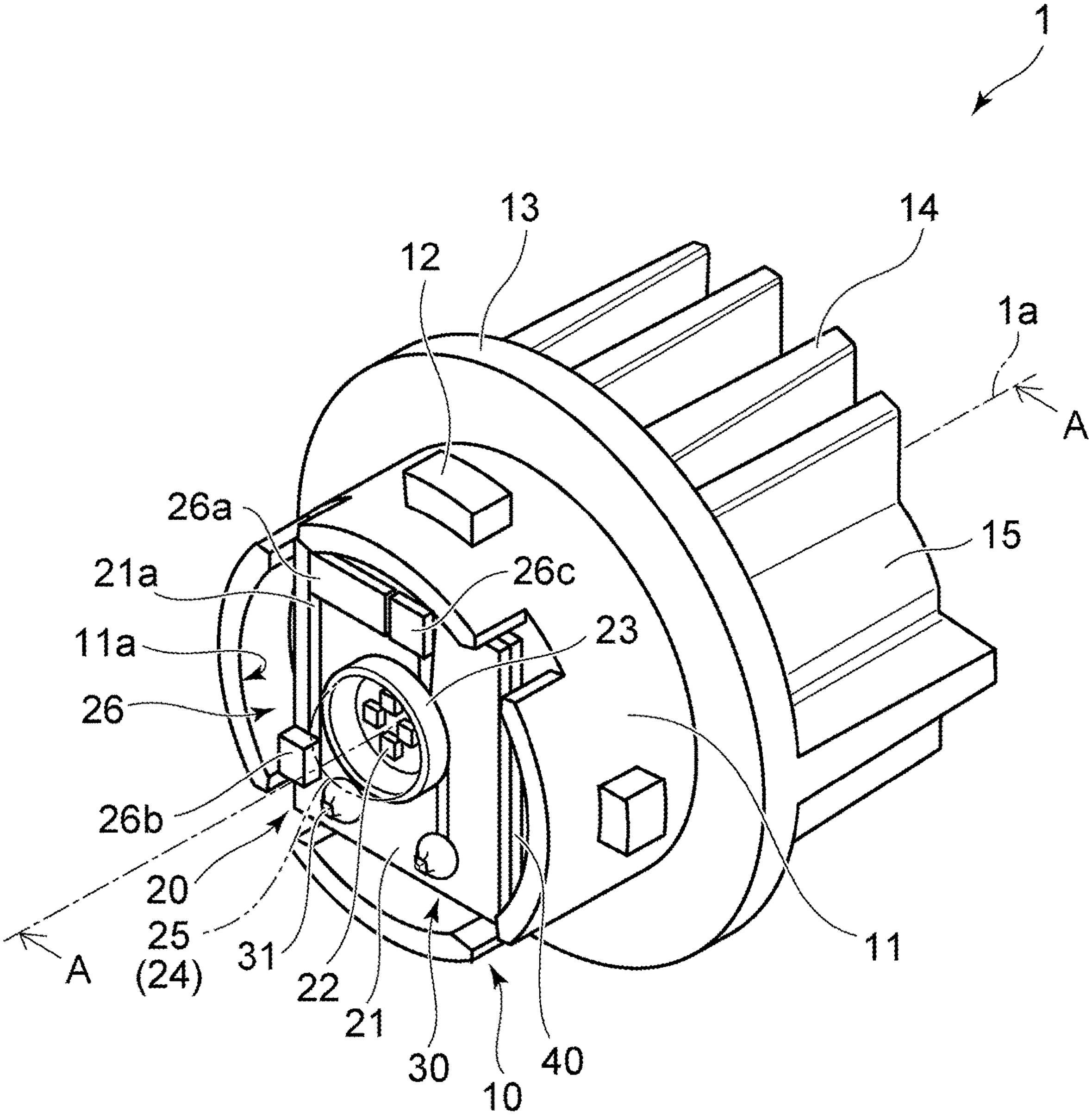
FIG. 1 is a schematic perspective diagram for illustrating a vehicle lighting device according to an embodiment.

FIG. 1 is a schematic perspective diagram for illustrating the vehicle lighting device 1 according to this embodiment.

Figure 2:
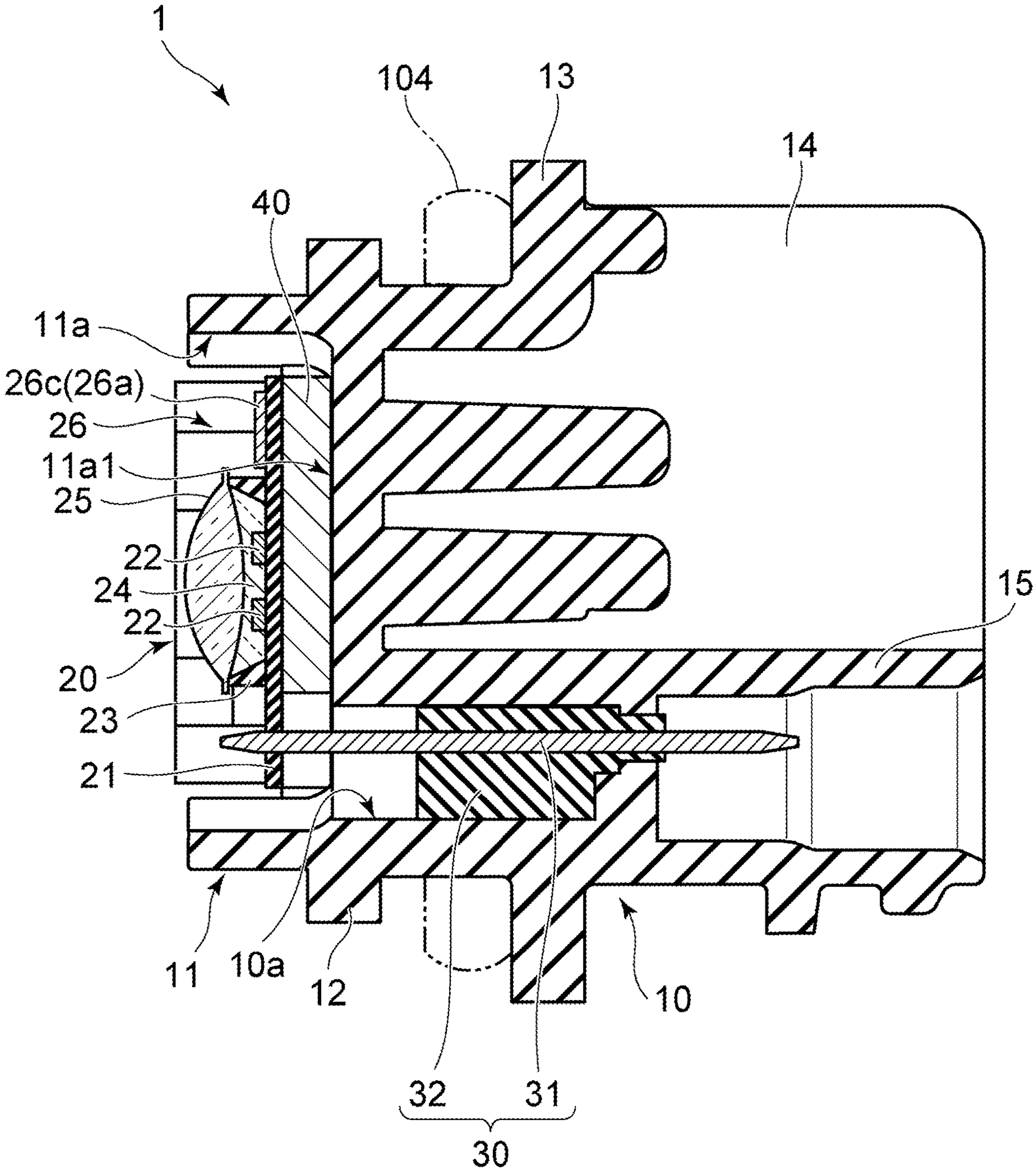
FIG. 2 is a cross-sectional diagram of the vehicle lighting device in FIG. 1, taken along a line A-A.

FIG. 2 is a cross-sectional diagram of the vehicle lighting device 1 in FIG. 1, taken along a line A-A.

As shown in FIGS. 1 and 2, the vehicle lighting device 1 is provided with, for example, a socket 10, a light emitting module 20, a power feeding portion 30 and a heat transfer portion 40.

The socket 10 includes, for example, a mounting portion 11, a bayonet 12, a flange 13, a heat radiation fin 14, and a connector holder 15.

The mounting portion 11 is provided, for example, on a surface of the flange 13 opposite to a side on which the heat radiation fin 14 is provided. An external shape of the mounting portion 11 may be columnar. An external shape of the mounting portion 11 is, for example, cylindrical. The mounting portion 11 has, for example, a recess portion 11*a* opening at an end portion opposite to the flange 13 side.

The bayonet 12 is provided on a side surface of the mounting portion 11, for example. The bayonet 12 protrudes toward the outside of the vehicle lighting device 1, for example. The bayonet 12 faces the flange 13. A plurality of bayonet 12 may be provided. The bayonet 12 is used when the vehicle lighting device 1 is mounted to, for example, a casing body 101 of a vehicle lamp 100 to be described later. The bayonet 12 may be used for twist locks.

The flange 13 has, for example, a plate shape. The flange 13 has, for example, a disk shape. The side surface of the flange 13 is located outside the vehicle lighting device 1 than a side surface of the bayonet 12.

The heat radiation fin 14 is provided, for example, on the side of the flange 13 opposite to the mounting portion 11 side. At least one heat radiation fin 14 may be provided. For example, the socket 10 illustrated in FIG. 1 is provided with a plurality of heat radiation fins 14. The plurality of heat radiation fins 14 may be arranged side by side in a predetermined direction. The heat radiation fins 14 are, for example, plate-shaped or tubular.

The connector holder 15 is provided, for example, on the side of the flange 13 opposite to the mounting portion 11 side. The connector holder 15 may be arranged side by side with the heat radiation fins 14. The connector holder 15 has a tubular shape, and a connector 105 having a sealing member 105*a* to be described later is inserted therein.

The socket 10 has a function of holding the light emitting module 20 and the power feeding portion 30 and a function of transmitting heat generated in the light emitting module 20 to the outside. Thus, it is preferable to form the socket 10 from a material having high thermal conductivity. For example, the socket 10 may be formed from a metal such as an aluminum alloy.

Moreover, in recent years, it is desired that the socket 10 may efficiently radiate the heat generated in the light emitting module 20 and be lightweight. Thus, it is more preferable to form the socket 10 from, for example, a high thermal conductive resin. The high thermal conductive resin includes, for example, a resin and a filler using an inorganic material. The high thermal conductive resin is, for example, a resin such as PET (Polyethylene terephthalate) or nylon mixed with a filler using carbon, aluminum oxide, or the like.

Assuming that the socket 10 includes a high thermal conductive resin and is integrally formed with the mounting portion 11, the bayonet 12, the flange 13, the heat radiation fin 14, and the connector holder 15, heat generated in the light emitting module 20 may be efficiently radiated. Also, the weight of the socket 10 may be reduced. In this case, the mounting portion 11, the bayonet 12, the flange 13, the heat radiation fin 14, and the connector holder 15 may be integrally formed using an injection molding method or the like. Alternatively, for example, the socket 10, the power feeding portion 30, and the heat transfer portion 40 may be integrally formed using an insert molding method or the like.

The power feeding portion 30 includes, for example, a plurality of power feeding terminals 31 and a holding portion 32.

The plurality of power feeding terminals 31 may be rod-shaped. The plurality of power feeding terminals 31 may be arranged side by side in a predetermined direction. One end portion of the plurality of power feeding terminals 31 protrudes from a bottom surface 11*al* of the recess portion 11*a*. One end portion of the power feeding terminals 31 is soldered to a wiring pattern 21*a* provided on a substrate 21. The other end portion of the plurality of power feeding terminals 31 is exposed to the inside of a hole of the connector holder 15. The connector 105 is fitted to the end portion of the plurality of power feeding terminals 31 exposed to the inside of the hole of the connector holder 15. The plurality of power feeding terminals 31 are made of metal such as copper alloy, for example. Moreover, the shape, arrangement, material, and the like of the plurality of power feeding terminals 31 are not limited to the examples, and may be changed as appropriate.

As previously mentioned, the socket 10 is preferably formed from a material having high thermal conductivity. However, materials having high thermal conductivity may have electrical conductivity. For example, metals such as aluminum alloys or high thermal conductive resins containing carbon-based fillers have electrical conductivity. Thus, the holding portion 32 is provided to insulate between the plurality of power feeding terminals 31 and the socket 10 having electrical conductivity. The holding portion 32 also has a function of holding the plurality of power feeding terminals 31. Note that if the socket 10 is made of an insulating, high thermal conductive resin (for example, a high thermal conductive resin containing a filler using aluminum oxide), the holding portion 32 may be omitted. In this case, the socket 10 holds the plurality of power feeding terminals 31. The holding portion 32 is made of, for example, an insulating resin. For example, the holding portion 32 may be press-fitted into a hole 10*a* provided in the socket 10 or adhered to an inner wall of the hole 10*a*.

The heat transfer portion 40 is provided, for example, between the substrate 21 and the bottom surface 11*al* of the recess portion 11*a*. The heat transfer portion 40 may be adhered to the bottom surface 11*al* of the recess portion 11*a*, for example. The adhesive that bonds the heat transfer portion 40 and the bottom surface 11*al* of the recess portion 11*a* preferably has high thermal conductivity. For example, the adhesive may be an adhesive mixed with a filler using an inorganic material. The inorganic material is preferably a material having high thermal conductivity (for example, ceramics such as aluminum oxide and aluminum nitride).

Moreover, the heat transfer portion 40 may be embedded in the bottom surface 11*al* of the recess portion 11*a* using an insert molding method. Further, the heat transfer portion 40 may also be attached to the bottom surface 11*a*1 of the recess portion 11*a* via a layer containing heat conductive grease (heat radiation grease). There is no particular limitation on the type of heat conductive grease, but for example, the heat conductive grease may be a mixture of modified silicone and a filler using a material having high thermal conductivity (for example, ceramics such as aluminum oxide and aluminum nitride).

The heat transfer portion 40 is provided to facilitate transfer of heat generated in the light emitting module 20 to the socket 10. Thus, it is preferable to form the heat transfer portion 40 from a material having a high thermal conductivity. The heat transfer portion 40 has a plate shape and may be made of metal such as aluminum, an aluminum alloy, copper, or a copper alloy, for example.

Note that the heat transfer portion 40 may be omitted when the heat generated in the light emitting module 20 is small.

The light emitting module 20 (the substrate 21) is provided on one end portion side of the socket 10, for example. The light emitting module 20 (the substrate 21) is adhered to the heat transfer portion 40, for example. When the heat transfer portion 40 is omitted, the light emitting module 20 (the substrate 21) is adhered to the bottom surface 11*al* of the recess portion 11*a*, for example. The adhesive for bonding the light emitting module 20 (the substrate 21) may be, for example, the same as the adhesive for bonding the heat transfer portion 40 and the bottom surface 11*al* of the recess portion 11*a*.

The light emitting module 20 includes the substrate 21, light emitting elements 22, a frame portion 23, a sealing portion 24, an optical element 25, and an element 26, for example.

The substrate 21 has a plate shape. The planar shape of the substrate 21 is, for example, quadrangle. The substrate 21 may be made of, for example, an inorganic material such as ceramics (e.g. aluminum oxide or aluminum nitride), or an organic material such as paper phenol or glass epoxy. Also, the substrate 21 may be a metal core substrate in which the surface of a metal plate is coated with an insulating material. When the amount of heat generated by the light emitting elements 22 is large, it is preferable to form the substrate 21 using a material having high thermal conductivity from the viewpoint of heat radiation. Examples of materials having high thermal conductivity include ceramics such as aluminum oxide and aluminum nitride, high thermal conductive resins, and metal core substrates. Moreover, the substrate 21 may have a single layer structure or may have a multilayer structure.

Further, the substrate 21 includes the wiring pattern 21*a*. The wiring pattern 21*a* is provided on a surface of the substrate 21. The wiring pattern 21*a* contains, for example, a material whose main component is silver or a material whose main component is copper.

The light emitting element 22 is provided on the substrate 21 (on a side opposite to the heat transfer portion 40 side). The light emitting element 22 is electrically connected to the wiring pattern 21*a*. A plurality of light emitting elements 22 are provided.

The light emitting element 22 may be, for example, a light emitting diode, an organic light emitting diode, a laser diode, or the like.

The light emitting element 22 may be a chip-shaped light emitting element, a surface-mounted light emitting element such as a PLCC (Plastic Leaded Chip Carrier) type, or may be a bullet type light emitting element having lead wires. The light emitting elements 22 illustrated in FIGS. 1 and 2 are chip-shaped light emitting elements.

In this case, if the light emitting element 22 is a surface-mounted light emitting element or a bullet type light emitting element having lead wires, the frame portion 23, the sealing portion 24, and the optical element 25 may be omitted. However, considering miniaturization of the light emitting module 20 and further miniaturization of the vehicle lighting device 1, it is preferable to use a chip-shaped light emitting element.

In the following, as an example, the case where the light emitting element 22 is a chip-shaped light emitting element will be described.

The chip-shaped light emitting element 22 may be mounted on the wiring pattern 21*a* by COB (Chip On Board). The chip-shaped light emitting element 22 may be, for example, any of an upper electrode type light emitting element, an upper and lower electrode type light emitting element, and a flip chip type light emitting element.

The frame portion 23 is provided on the substrate 21. The frame portion 23 has a frame shape and is adhered to the substrate 21. The plurality of light emitting elements 22 are provided in a region surrounded by the frame portion 23. The frame portion 23 is made of resin, for example. The resin may be, for example, a thermoplastic resin such as PBT (polybutylene terephthalate), PC (polycarbonate), PET, nylon, PP (polypropylene), PE (polyethylene), or PS (polystyrene).

The frame portion 23 may have a function of defining the formation range of the sealing portion 24 and a function of a reflector. Thus, the frame portion 23 may contain titanium oxide particles or the like, or may contain white resin, in order to improve the reflectance.

Also, the frame portion 23 may be omitted. However, if the frame portion 23 is provided, the utilization efficiency of the light irradiated from the light emitting element 22 can be improved. Moreover, since the range in which the sealing portion 24 is formed may be reduced, it is possible to achieve miniaturization of the light emitting module 20 and thus miniaturization of the vehicle lighting device 1.

The sealing portion 24 is provided inside the frame portion 23. The sealing portion 24 is provided so as to cover the region surrounded by the frame portion 23. The sealing portion 24 is provided so as to cover the light emitting element 22. The sealing portion 24 contains a translucent resin. The sealing portion 24 is formed, for example, by filling the inside of the frame portion 23 with resin. Filling of the resin is performed using a dispenser or the like, for example. The filling resin is, for example, a silicone resin.

Moreover, when the frame portion 23 is omitted, for example, a dome-shaped sealing portion 24 is provided on the substrate 21.

Moreover, the sealing portion 24 may contain a phosphor. The phosphor may be, for example, a YAG-based phosphor (yttrium-aluminum-garnet-based phosphor). However, the type of phosphor may be appropriately changed according to the application of the vehicle lighting device 1 such that a predetermined emission color is obtained.

The optical element 25 may be provided over the sealing portion 24. The optical element 25 may be, for example, a convex lens, a concave lens, a light guide, or the like. The optical element 25 illustrated in FIG. 2 is a convex lens. Note that the optical element 25 is not necessarily required and may be omitted. However, when the optical element 25 is provided, it is easier to obtain a predetermined light distribution characteristics.

The element 26 may be a passive element or an active element configured to construct a light emitting circuit including the light emitting elements 22. The element 26 is provided, for example, around the frame portion 23 and electrically connected to the wiring pattern 21*a*.

The element 26 may be, for example, a resistor 26*a*, a diode 26*b*, a control element 26*c*, or the like.

However, the type of the element 26 is not limited to the examples, and may be changed as appropriate according to the configuration of the light emitting circuit including the light emitting elements 22. For example, in addition to the above, the element 26 may be a capacitor, a positive temperature coefficient thermistor, a negative temperature coefficient thermistor, a Zener diode, an inductor, a surge absorber, a varistor, a transistor such as an FET or a bipolar transistor, an integrated circuit, an arithmetic element, or the like.

The resistor 26*a* is provided on the substrate 21. The resistor 26*a* is electrically connected to the wiring pattern 21*a*. The resistor 26*a* may be, for example, a surface-mounted resistor, a resistor having lead wires (metal oxide film resistor), or a film-like resistor formed using a screen printing method or the like. Note that the resistor 26*a* illustrated in FIG. 1 is a film-like resistor.

The material of the film-like resistor is, for example, ruthenium oxide ($RuO_2$). The film-like resistor is formed using, for example, a screen printing method and a firing method. If the resistor 26*a* is a film-like resistor, a contact area between the resistor 26*a* and the substrate 21 may be increased, and heat radiation can be improved. Also, a plurality of resistors 26*a* may be formed at once. Thus, productivity can be improved. Moreover, it is possible to suppress variations in resistance values of the plurality of resistors 26*a*.

Here, since the forward voltage characteristics of the light emitting elements 22 vary, if the voltage applied between an anode terminal and a ground terminal is constant, variations occur in the brightness of the light irradiated from the light emitting elements 22 (luminous flux, luminance, luminous intensity, illuminance). Thus, the resistor 26*a* connected in series with the light emitting elements 22 keeps the value of the current flowing through the light emitting elements 22 within a predetermined range such that that the brightness of the light irradiated from the light emitting elements 22 is within a predetermined range. In this case, by changing the resistance value of the resistor 26*a*, the value of the current flowing through the light emitting elements 22 is kept within a predetermined range.

If the resistor 26*a* is a surface-mounted resistor or a resistor having lead wires, the resistor 26*a* having an appropriate resistance value is selected according to the forward voltage characteristics of the light emitting elements 22. If the resistor 26*a* is a film-like resistor, the resistance value may be increased by removing part of the resistor 26*a*. For example, by irradiating a film-like resistor with laser light, part of the film-like resistor may be easily removed. Note that the number, size, arrangement, etc. of the resistors 26*a* are not limited to the examples, and may be appropriately changed according to the number and specifications of the light emitting elements 22, and the like.

The diode 26*b* is provided on the substrate 21. The diode 26*b* is electrically connected to the wiring pattern 21*a*. The diode 26*b* is electrically connected between the power feeding terminal 31 and the light emitting element 22 as well as the control element 26*c*. For example, the diode 26*b* is provided to prevent reverse voltage from being applied to the light emitting element 22 and the control element 26*c* and to prevent pulse noise from being applied to the light emitting element 22 and the control element 26*c* from the reverse direction. The diode 26*b* is, for example, a surface-mounted diode or a diode having lead wires. The diode 26*b* illustrated in FIG. 1 is a surface-mounted diode.

Here, the voltage (input voltage) applied to the vehicle lighting device 1 may fluctuate. For example, the operating standard voltage (rated voltage) of the vehicle lighting device 1 for general automobiles is about 13.5V. However, the input voltage may fluctuate due to the voltage drop of the battery, the operation of the alternator, the influence of the circuit, etc. Thus, the operating voltage range (voltage fluctuation range) is defined in the vehicle lighting device 1 for automobiles. The operating voltage range is, for example, 9V or higher and 16V or lower.

Moreover, there is a forward voltage drop in the light emitting element 22. Thus, when the input voltage of the plurality of light emitting elements 22 connected in series decreases, the total luminous flux of the light irradiated from the plurality of light emitting elements 22 decreases. Also, in the vicinity of the lower limit of the operating voltage range, the total luminous flux of the vehicle lighting device 1 may be less than the specified value. For example, if the forward voltage drop of the light emitting element 22 is about 3V, connecting three light emitting elements 22 in series results in a voltage drop of 9V. The resistor 26*a* is also connected in series to the three light emitting elements 22. Thus, when the input voltage is about 9V, almost no current flows through the three light emitting elements 22, and the total luminous flux of the vehicle lighting device 1 becomes less than the specified value.

In this case, in a case where the number of light emitting elements 22 to be turned on is changed according to the input voltage, it is possible to prevent the total luminous flux of the vehicle lighting device 1 from becoming less than the specified value near the lower limit of the operating voltage range. For example, when the input voltage drops, if the number of the light emitting elements 22 to be turned on is reduced, the current flowing through the light emitting elements 22 to be turned on can be increased, such that the total luminous flux of the vehicle lighting device 1 cab be suppressed from becoming less than a specified value.

However, if only the number of light emitting elements 22 to be turned on is changed, the rate of change of the total luminous flux increases when the number of light emitting elements 22 to be turned on is changed. When the rate of change of the total luminous flux increases, for example, a driver of a vehicle such as an automobile may feel uncomfortable.

Figure 3:
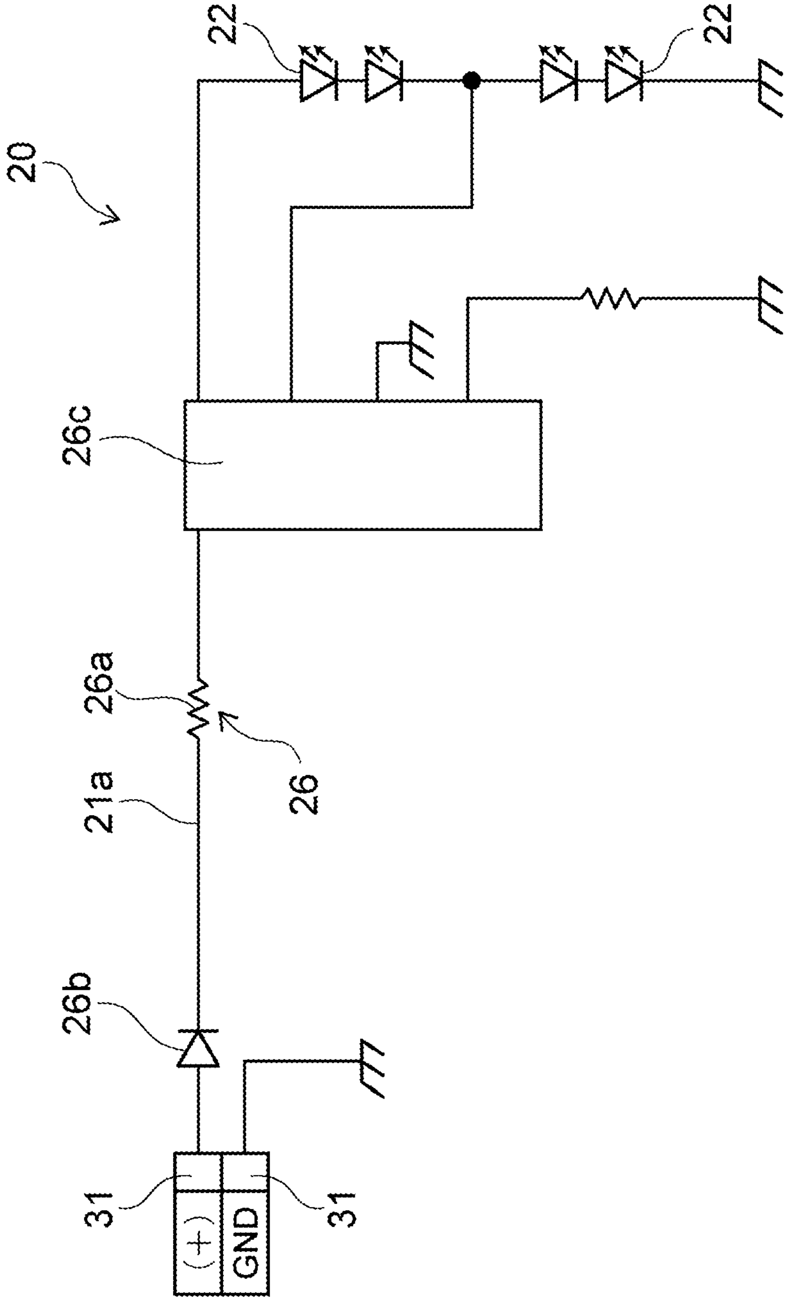
FIG. 3 is a circuit diagram of a light emitting module.

Thus, the light emitting module 20 is provided with the control element 26*c*. FIG. 3 is a circuit diagram of the light emitting module 20.

As shown in FIG. 3, the control element 26*c* is electrically connected between the resistor 26*a* and the plurality of light emitting elements 22. The light emitting module 20 illustrated in FIGS. 1 and 3 is provided with four light emitting elements 22.

The control element 26*c* is provided on the substrate 21. The control element 26*c* is electrically connected to the plurality of light emitting elements 22 via the wiring pattern 21*a*.

The control element 26*c* detects the input voltage and changes the number of the light emitting elements 22 through which the current flows according to the detected input voltage. For example, as shown in FIG. 3, when the input voltage is higher than a predetermined voltage, the control element 26*c* causes current to flow through the four light emitting elements 22 connected in series. When the input voltage is lower than the predetermined voltage, the control element 26*c* causes current to flow through two light emitting elements 22 connected in series and not flow through the other two light emitting elements 22 connected in series. In this way, it is possible to prevent the current flowing through the two light emitting elements 22 from decreasing when the input voltage drops. Thus, the required total luminous flux can be ensured when the input voltage drops.

However, if only the number of light emitting elements 22 to be turned on is changed, the rate of change of the total luminous flux increases when the number of light emitting elements 22 to be turned on is changed.

Figure 4:
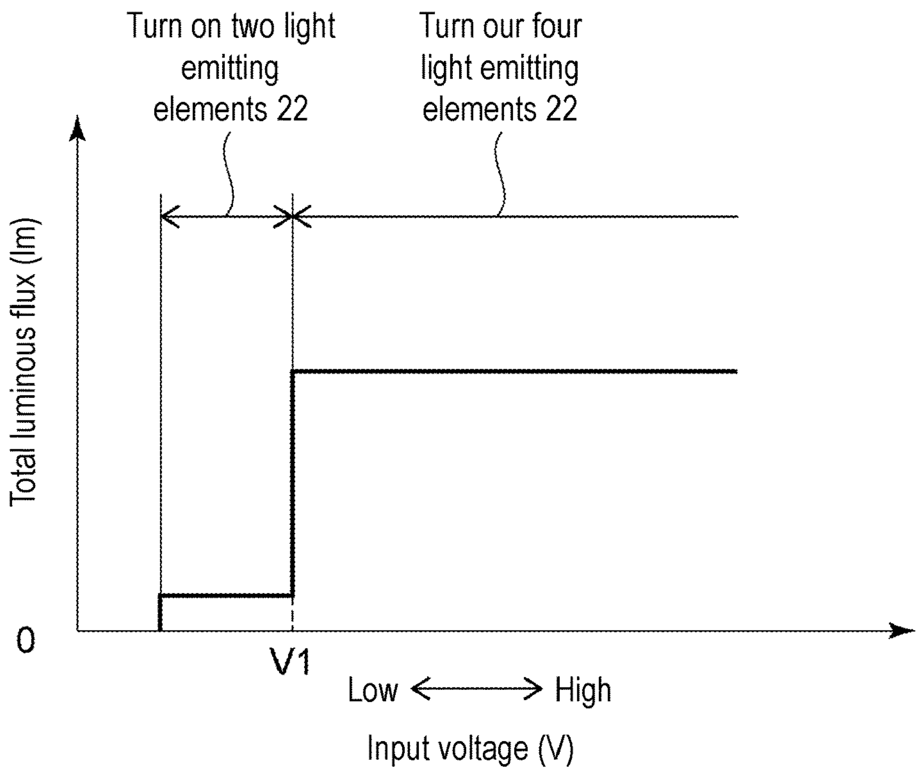
FIG. 4 is a graph for illustrating the relationship between input voltage and total luminous flux according to a comparative example.

FIG. 4 is a graph for illustrating the relationship between input voltage and total luminous flux according to a comparative example.

FIG. 4 illustrates a case in which only the number of light emitting elements 22 to be turned on is changed when the input voltage reaches a voltage V1.

As may be seen from FIG. 4, when the input voltage reaches the voltage V1, if only the number of light emitting elements 22 to be turned on is changed, the rate of change of the total luminous flux increases. When the rate of change of the total luminous flux increases, for example, a driver of a vehicle such as an automobile may feel uncomfortable.

Figure 5:
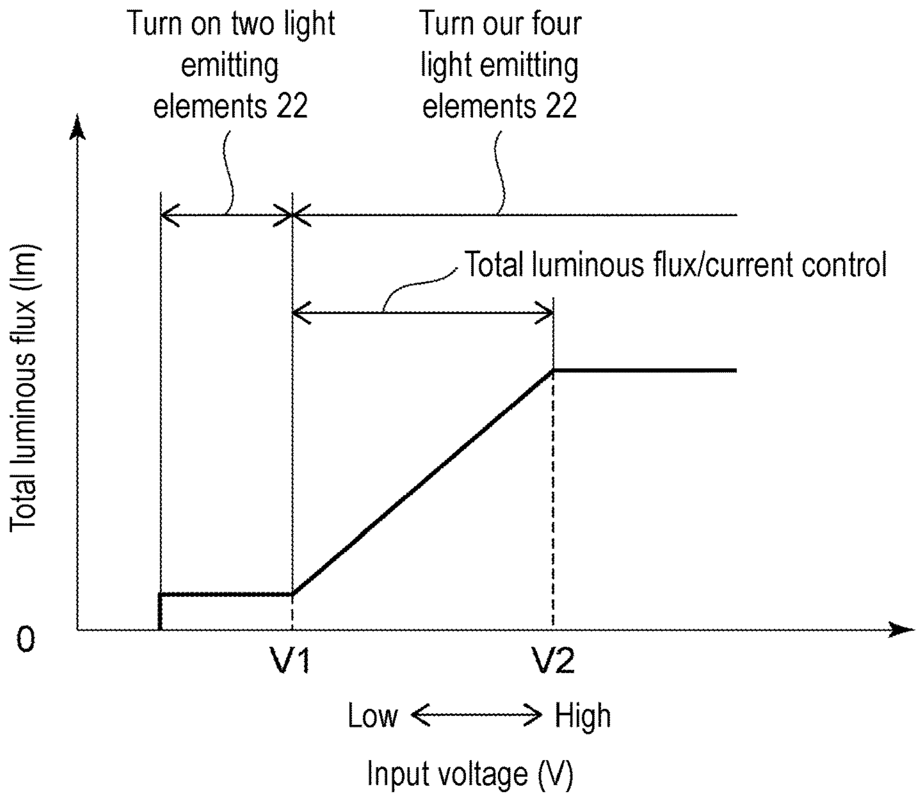
FIG. 5 is a graph for illustrating the relationship between input voltage and total luminous flux when controlled by a control element.

FIG. 5 is a graph for illustrating the relationship between input voltage and total luminous flux when controlled by the control element 26*c*.

As shown in FIG. 5, the control element 26*c* changes the number of light emitting elements 22 to be turned on when the input voltage reaches the voltage V1 (corresponding to an example of a first voltage).

For example, the control element 26*c* turns on two light emitting elements 22 and turns off two light emitting elements 22 when the input voltage is lower than the voltage V1.

For example, the control element 26*c* turns on the four light emitting elements 22 when the input voltage exceeds a voltage V2 (corresponding to an example of a second voltage) higher than the voltage V1.

For example, the control element 26*c* turns on the four light emitting elements 22 and changes at least one of the total luminous flux of the four light emitting elements 22 and the current flowing through the four light emitting elements 22 according to the input voltage when the input voltage is equal to or higher than the voltage V1 and equal to or lower than the voltage V2.

In other words, the control element 26*c* turns on some of the plurality of light emitting elements 22 when the input voltage is lower than the voltage V1.

The control element 26*c* turns on all of the plurality of light emitting elements 22 when the input voltage exceeds the voltage V2 higher than the voltage V1.

The control element 26*c* turns on all of the plurality of light emitting elements 22 and changes at least one of the total luminous flux of the plurality of light emitting elements 22 and the current flowing through the plurality of light emitting elements 22 according to the input voltage when the input voltage is equal to or higher than the voltage V1 and equal to or lower than the voltage V2.

For example, the control element 26*c* changes the rate of change of the total luminous flux of the plurality of light emitting elements 22 to 5.1% or more with respect to a change of 0.1V in the input voltage when the input voltage is equal to or higher than the voltage V1 and equal to or lower than the voltage V2.

Moreover, there is a positive correlation between the total luminous flux and the current flowing through the light emitting element 22. Thus, for example, the control element 26*c* may also change the rate of change of the current flowing through the plurality of light emitting elements 22 to 5.1% or more with respect to a change of 0.1V in the input voltage when the input voltage is equal to or higher than the voltage V1 and equal to or lower than the voltage V2.

By doing so, it is possible to prevent the driver from feeling uncomfortable when the number of light emitting elements 22 to be turned on is changed.

The control parameters of the control element 26*c* (for example, the relationship between the input voltage and the total luminous flux, the relationship between the currents flowing through the plurality of light emitting elements 22 and the total luminous flux, etc.) may be obtained through experiments or simulations.

Further, the control element 26*c* does not perform the above-described control of the total luminous flux and the above-described current when the input voltage is lower than the voltage V1 or exceeds the voltage V2.

As described above, when the control element 26*c* is provided, even if the input voltage fluctuates, the necessary total luminous flux can be ensured, and an increase in the rate of change of the total luminous flux can be suppressed.

Here, when the number of light emitting elements 22 to be turned on is changed, the light distribution characteristics and light emission distribution may change significantly. Thus, when the number of the light emitting elements 22 to be turned on is changed, it is preferable to turn on the light emitting elements 22 provided at predetermined positions.

For example, when the plurality of light emitting elements 22 are provided at positions that are rotationally symmetrical with respect to a central axis 1*a* of the vehicle lighting device 1 (the light emitting module 20), the control element 26*c* may turn on adjacent light emitting elements 22 or turn on the light emitting elements 22 facing each other across the central axis 1*a*.

(a) to (d) of FIG. 6, and (a) and (b) of FIG. 7 are schematic diagrams for illustrating a case where two of the four light emitting elements 22 are turned on.

As shown in (a) to (d) of FIG. 6, and (a) and (b) of FIG. 7, the four light emitting elements 22 are provided at four-fold symmetry with respect to the central axis 1*a* of the vehicle lighting device 1 (the light emitting module 20).

As shown in (a) to (d) of FIG. 6, the control element 26*c* may turn on two adjacent light emitting elements 22. In this way, when the number of the light emitting elements 22 to be turned on is reduced from four to two, or the number of the light emitting elements 22 to be turned on is increased from two to four, it is possible to suppress large changes in light distribution characteristics and light emission distribution.

As shown in (a) and (b) of FIG. 7, the control element 26*c* may turn on the two light emitting elements 22 facing each other across the central axis 1*a*. In this way, when the number of the light emitting elements 22 to be turned on is reduced from four to two, or the number of the light emitting elements 22 to be turned on is increased from two to four, it is possible to suppress large changes in light distribution characteristics and light emission distribution.

(Vehicle Lamp)

In one embodiment of the disclosure, the vehicle lamp 100 including the vehicle lighting device 1 may be provided. Both the description of the above-described vehicle lighting device 1 and the modifications of the vehicle lighting device 1 (for example, those in which a person skilled in the art appropriately adds, deletes, or changes the design of components and which have the features of the disclosure) may be applied to the vehicle lamp 100.

In the following description, as an example, the case where the vehicle lamp 100 is a rear combination light provided in an automobile will be described. However, the vehicle lamp 100 is not limited to a rear combination light provided in an automobile. The vehicle lamp 100 may be configured as long as it is provided in an automobile, railroad vehicle, or the like.

FIG. 8 is a schematic partial cross-sectional diagram for illustrating the vehicle lamp 100.

As shown in FIG. 8, the vehicle lamp 100 includes, for example, the vehicle lighting device 1, the casing body 101, a cover 102, an optical element 103, a sealing member 104, and the connector 105.

The vehicle lighting device 1 is installed in the casing body 101. The casing body 101 holds the mounting portion 11. The casing body 101 has a box shape with one end portion open. The casing body 101 is made of, for example, resin that does not transmit light. A bottom surface of the casing body 101 is provided with a mounting hole 101*a* into which a portion of the mounting portion 11 provided with the bayonet 12 is inserted. A recess portion into which the bayonet 12 provided on the mounting portion 11 is inserted is provided on the periphery of the mounting hole 101*a*. Although the case where the casing body 101 is directly provided with the mounting hole 101*a* is illustrated, the casing body 101 may be provided with a mounting member having the mounting hole 101*a*.

When the vehicle lighting device 1 is installed on the vehicle lamp 100, the portion of the mounting portion 11 provided with the bayonet 12 is inserted into the mounting hole 101*a*, to rotate the vehicle lighting device 1. Then, for example, the bayonet 12 is held by a fitting portion provided on the periphery of the mounting hole 101*a*. Such an installation method is called a twist lock.

The cover 102 is provided to close the opening of the casing body 101. The cover 102 is made of translucent resin or the like. The cover 102 may also have functions such as a lens.

Light emitted from the vehicle lighting device 1 enters the optical element 103. The optical element 103 reflects, diffuses, guides, and collects the light emitted from the vehicle lighting device 1, and forms a predetermined light distribution pattern. For example, the optical element 103 illustrated in FIG. 8 is a reflector. In this case, the optical element 103 reflects the light emitted from the vehicle lighting device 1 to form a predetermined light distribution pattern.

The sealing member 104 is provided between the flange 13 and the casing body 101. The sealing member 104 has an annular shape and is made of an elastic material such as rubber or silicone resin.

When the vehicle lighting device 1 is installed on the vehicle lamp 100, the sealing member 104 is sandwiched between the flange 13 and the casing body 101. Thus, the internal space of the casing body 101 may be sealed by the sealing member 104. Also, the elastic force of the sealing member 104 presses the bayonet 12 against the casing body 101. Thus, it is possible to prevent the vehicle lighting device 1 from detaching from the casing body 101.

The connector 105 is fitted to the end portion of the power feeding terminal 31 exposed inside the connector holder 15. A power source or the like is electrically connected to the connector 105. Thus, by fitting the connector 105 to the end portion of the power feeding terminal 31, the light emitting element 22 may be electrically connected to the power source or the like.

Further, the connector 105 is provided with the sealing member 105*a*. When the connector 105 having the sealing member 105*a* is inserted into the connector holder 15, the interior of the connector holder 15 is sealed so as to be watertight.

Although some embodiments of the disclosure have been illustrated above, these embodiments are presented by way of example and are not intended to limit the scope of the disclosure. These novel embodiments may be implemented in various other forms, and various omissions, replacements, changes, etc. may be made without departing from the scope of the disclosure. These embodiments and their modifications are included in the scope and gist of the disclosure, and are included in the scope of the disclosure described in the claims and equivalents thereof. Moreover, each of the above-described embodiments may be implemented in combination with each other.

Additional remarks regarding the above-described embodiment are shown below.

(Appendix 1)

A vehicle lighting device, including:

a socket;

a substrate provided on one end portion side of the socket;

a plurality of light emitting elements provided on the substrate; and a control element provided on the substrate and electrically connected to the plurality of light emitting elements, wherein the control element turns on some of the plurality of light emitting elements when an input voltage is lower than a first voltage;

turns on all of the plurality of light emitting elements when the input voltage exceeds a second voltage higher than the first voltage; and turns on all of the plurality of light emitting elements and changes at least one of a total luminous flux of the plurality of light emitting elements and current flowing through the plurality of light emitting elements according to the input voltage when the input voltage is equal to or higher than the first voltage and equal to or lower than the second voltage.

(Appendix 2)

The vehicle lighting device according to appendix 1, wherein the control element changes a rate of change of the total luminous flux of the plurality of light emitting elements to be 5.1% or more with respect to a change of 0.1V in the input voltage when the input voltage is equal to or higher than the first voltage and equal to or lower than the second voltage.

(Appendix 3)

The vehicle lighting device according to appendix 1, wherein the control element changes a rate of change of the current flowing through the plurality of light emitting elements to be 5.1% or more with respect to a change of 0.1 V in the input voltage when the input voltage is equal to or higher than the first voltage and equal to or lower than the second voltage.

(Appendix 4)

The vehicle lighting device according to any one of appendices 1 to 3, wherein the plurality of light emitting elements are provided at positions that are rotationally symmetrical with respect to a central axis of the vehicle lighting device; and the control element turns on the adjacent light emitting elements or turns on the light emitting elements facing each other across the central axis when the input voltage is lower than the first voltage.

(Appendix 5)

A vehicle lamp, including:

the vehicle lighting device according to any one of appendices 1 to 4, and a casing body to which the vehicle lighting device is installed.

What is claimed is:

1. A vehicle lighting device, comprising:

a socket;

a substrate provided on one end portion side of the socket;

a plurality of light emitting elements provided on the substrate; and a control element provided on the substrate and electrically connected to the plurality of light emitting elements, wherein the control element is configured to:

turn on some of the plurality of light emitting elements when an input voltage is lower than a first voltage;

turn on all of the plurality of light emitting elements when the input voltage exceeds a second voltage higher than the first voltage; and turn on all of the plurality of light emitting elements and change at least one of a total luminous flux of the plurality of light emitting elements and a current flowing through the plurality of light emitting elements according to the input voltage when the input voltage is equal to or higher than the first voltage and equal to or lower than the second voltage.

2. The vehicle lighting device according to claim 1, wherein the control element is configured to change a rate of change of the total luminous flux of the plurality of light emitting elements to be 5.1% or more with respect to a change of 0.1V in the input voltage when the input voltage is equal to or higher than the first voltage and equal to or lower than the second voltage.

3. The vehicle lighting device according to claim 2, wherein the plurality of light emitting elements are provided at positions that are rotationally symmetrical with respect to a central axis of the vehicle lighting device; and the control element is configured to turn on the adjacent light emitting elements or turn on the light emitting elements facing each other across the central axis when the input voltage is lower than the first voltage.

4. A vehicle lamp, comprising:

the vehicle lighting device according to claim 3, and a casing body to which the vehicle lighting device is installed.

5. A vehicle lamp, comprising:

the vehicle lighting device according to claim 2, and a casing body to which the vehicle lighting device is installed.

6. The vehicle lighting device according to claim 1, wherein the control element is configured to change a rate of change of the current flowing through the plurality of light emitting elements to be 5.1% or more with respect to a change of 0.1 V in the input voltage when the input voltage is equal to or higher than the first voltage and equal to or lower than the second voltage.

7. The vehicle lighting device according to claim 6, wherein the plurality of light emitting elements are provided at positions that are rotationally symmetrical with respect to a central axis of the vehicle lighting device; and the control element is configured to turn on the adjacent light emitting elements or turn on the light emitting elements facing each other across the central axis when the input voltage is lower than the first voltage.

8. A vehicle lamp, comprising:

the vehicle lighting device according to claim 7, and a casing body to which the vehicle lighting device is installed.

9. A vehicle lamp, comprising:

the vehicle lighting device according to claim 6, and a casing body to which the vehicle lighting device is installed.

10. The vehicle lighting device according to claim 1, wherein the plurality of light emitting elements are provided at positions that are rotationally symmetrical with respect to a central axis of the vehicle lighting device; and the control element is configured to turn on the adjacent light emitting elements or turn on the light emitting elements facing each other across the central axis when the input voltage is lower than the first voltage.

11. A vehicle lamp, comprising:

the vehicle lighting device according to claim 10, and a casing body to which the vehicle lighting device is installed.

12. A vehicle lamp, comprising:

the vehicle lighting device according to claim 1, and a casing body to which the vehicle lighting device is installed.

* * * * *